Patented Aug. 29, 1950

2,520,711

UNITED STATES PATENT OFFICE 2,520,711

COMPOSITION OF CROTYL CELLULOSE AND COMPATIBLE BUTADIENE COPOLYMER

William Hale Charch, Buffalo, N. Y., assignor to E. I. du Pont de Nemours & Company, Wilmington, Del., a corporation of Delaware No Drawing. Application March 11, 1947, Serial No. 733,979

8 Claims. (Cl. 260—17)

This invention relates to new cellulose derivatives and the method of making the same, as well as to shaped articles produced therefrom. More particularly, it relates to the insoluble product obtained by the cross-vulcanization of an unsaturated cellulose derivative and an elastomer (synthetic rubber containing a carbinol group) and the method of making the same, as well as to shaped articles produced therefrom.

An object of this invention is to provide a new cellulose derivative.

Another object of this invention is to provide a cellulose derivative which is insoluble and has improved softness and pliability.

A further object of this invention is to provide a new and improved method of producing the above-mentioned cellulose derivatives.

Other and additional objects will become apparent hereinafter.

The objects of this invention are accomplished, in general, by cross-vulcanizing an unsaturated cellulose derivative, such as crotyl cellulose, and a compatible synthetic elastomer, such as a polymeric diene containing a carbinol group. Preferably, the unsaturated cellulose derivative and the compatible synthetic elastomer, as well as a vulcanizing agent, are dissolved in a common solvent and the shaped article produced therefrom subjected to heat whereby the cross-vulcanization is effected. If desired, a vulcanizing accelerator can also be incorporated in the solution.

After vulcanization, the synthetic elastomer and the cellulose derivative cannot be separated by extraction with solvents from the product.

The details and manner of practicing the invention will become apparent by reference to the following specific examples, it being understood that these examples are merely illustrative embodiments of the invention and that the scope of the invention is not limited thereto. Throughout the examples, the proportions of the ingredients are parts by weight.

Example I

A 10% solution of the copolymer of 70 parts of butadiene with 30 parts of dimethyl 2-vinylethynyl carbinol in toluene was mixed with an equal weight of a 10% solution of crotyl ethyl cellulose (0.85 crotyl and 1.8 ethyl groups per glucose unit) in toluene. To this mixture was added a solution of sulfur and 2-mercaptothiazoline in toluene to give a clear solution containing a mixture of the solids in the following proportions:

| | Parts |
|---|---|
| Copolymer of butadiene with dimethyl 2-vinylethynyl carbinol (70/30) | 50 |
| Crotyl ethyl cellulose | 50 |
| Sulfur | 3 |
| 2-mercaptothiazoline | 3 |

From this solution, films were cast on a smooth surface and, after evaporation of the solvent, were baked in an oven for 2 hours at 100° C. At the end of the baking treatment, the films were insoluble, brilliantly clear, tough, pliable, and recovered at least 90% from a 100% stretch.

Example II

To a 10% solution of the copolymer of 70 parts of butadiene with 30 parts of dimethyl 2-vinylethynyl carbinol in toluene containing sulfur and zinc dibutyl dithiocarbamate (butyl zimate) was added an equal weight of a 10% solution of crotyl ethyl cellulose (0.85 crotyl and 1.8 ethyl groups per glucose unit) to give a clear solution containing a mixture of the solids in the following proportions:

| | Parts |
|---|---|
| Copolymer of butadiene with dimethyl 2-vinylethynyl carbinol (70/30) | 50 |
| Crotyl ethyl cellulose | 50 |
| Butyl zimate | 4 |
| Sulfur | 1.25 |

From this solution, films were cast on a smooth surface and, after evaporation of the solvent, were baked in an oven for 2 hours at 110° C. At the end of the baking treatment, the films were insoluble, bright, clear, pliable, soft, and recovered 90% from a 100% stretch.

Example III

Solutions of the copolymer of 70 parts of butadiene with 30 parts of dimethyl 2-vinylethynyl carbinol and crotyl ethyl cellulose (0.85 crotyl and 1.8 ethyl groups per glucose unit) in a solvent composed of 90 parts of toluene and 10 parts of ethanol were mixed with sulfur and butyl zimate to give a mixture containing the ingredients in the following proportions:

| | Parts |
|---|---|
| Copolymer of butadiene with dimethyl 2-vinylethynyl carbinol (70/30) | 15 |
| Crotyl ethyl cellulose | 85 |
| Sulfur | 3 |
| Butyl zimate | 4 |

Films were cast from this solution and, after evaporation of the solvent, were heated for 1 hour at 110° C. The films were insoluble, bright, clear, and remained flexible even after heating 16 hours.

In order to obtain truly clear, homogeneous films free of agglomerates visible with a simple magnifying glass, the unsaturated cellulose derivative and the synthetic elastomer must be truly compatible. If the two polymeric components are not truly compatible, agglomerates, visible with a simple magnifying glass, will be formed in a film produced from a mixture of such components. The films obtained by this invention are clear and free of agglomerates even when observed with a simple magnifying glass.

Though, as shown by the examples, the copolymer of butadiene (70 parts) with dimethyl 2-vinylethynyl carbinol (30 parts) is the preferred synthetic elastomer, the invention is not restricted thereto. In general, synthetic elastomers containing hydroxyl groups, such as polymeric dienes containing hydroxyl groups, can be used. Such polymeric dienes are truly compatible with unsaturated cellulose derivatives contemplated by this invention. Copolymer of butadiene (60 parts) with dimethyl isopropenylethynyl carbinol (40 parts) is another illustrative example of a polymeric diene containing a hydroxyl group which can be used.

The proportions of the monomers constituting the polymeric dienes containing hydroxyl groups can vary. Satisfactory results can be obtained with copolymers in which the ratio of the butadiene to the dimethyl 2-vinylethynyl carbinol or dimethyl isopropenylethynyl carbinol is within the limits of 50:50 and 80:20.

The polymeric dienes containing hydroxyl groups are prepared by polymerizing a mixture of butadiene and dimethyl-2-vinylethynyl carbinol or dimethyl isopropenylethynyl carbinol in the desired proportions. In general, the two-component mixture of butadiene and dimethyl (vinyl or isopropenyl) ethynyl carbinol can be emulsified and then polymerized by the method employed for the three-component system in Example 1 of British Patent 568,964.

The polymeric dienes containing hydroxyl groups, and particularly the copolymers of butadiene with dimethyl 2-vinylethynyl carbinol or dimethyl isopropenylethynyl carbinol, are unique in that they are truly compatible with crotyl cellulose since they are not compatible with cellulose acetate or cellulose nitrate. The uniqueness of the polymeric dienes containing hydroxyl groups becomes more apparent since other rubbers are not compatible with crotyl cellulose.

Though, as shown by the examples, crotyl ethyl cellulose containing 0.85 crotyl and 1.8 ethyl groups per glucose unit is preferred, the invention is not restricted thereto. Any crotyl cellulose containing between two and three crotyl groups per glucose unit can be used. However, as shown by the examples, it is not necessary that all the subtituents be crotyl groups. The crotyl cellulose can contain other substituents. Ether groups other than crotyl, for example methyl, ethyl, butyl, propyl, etc., or ester groups, such as acetyl, butyryl, propionyl, etc., can constitute such other substituents. When the crotyl cellulose also contains such other ether or ester substituent groups, the total substitution including the crotyl groups shall be between two and three substituent groups per glucose unit. The crotyl substitution can be obtained by etherifying cellulose or glycol cellulose with crotonyl chloride in any known manner.

Crotyl cellulose and the polymeric dienes containing hydroxyl groups are truly compatible over the entire range of proportions, and hence the proportions thereof are not restricted to any specific relative ratios, though those set forth in the examples are preferred. The crotyl cellulose can be present in an amount of from 1% to 99% based on the amount of polymeric diene containing a hydroxyl group. However, the higher the cellulose content, the less plastic the product; and the higher the synthetic elastomer content, the softer, more tacky, and lower the modulus of the product.

Any aromatic hydrocarbon or mixture of hydrocarbon with alcohol, in which the alcohol content does not exceed 40%, can be used. Benzene, xylene, toluene, and chlorinated benzene are illustrative examples of such hydrocarbons. Methyl alcohol, ethyl alcohol, isopropyl alcohol, etc. are illustrative examples of alcohols which also can be used.

The total concentration of both the crotyl cellulose and the polymeric diene containing a hydroxyl group in the solution can vary within limits depending on the shaped article to be produced from such solution. In general, the concentration can be from 5% to 15%, and preferably 10%.

The invention is not restricted to any vulcanizing agent. Any of the well-known vulcanizing agents, with or without sulfur, can be used. Insolubility can be obtained also by heat alone, or heat in the presence of a peroxide, such as benzoyl peroxide, acetyl peroxide, tertiary butylhydro peroxide, and ascaridole, but the product will not be as pliable. In general, the sulfur can be present in an amount of from 0% to 5% and the accelerator, depending on its nature, from 0.5% to 5%. Alternatively, the composition need not contain a vulcanizing agent, in which case the shaped product is vulcanized by the well-known dry cure, utilizing sulfur chloride or the like.

The temperature at which the cross-linking is effected is not critical. Temperatures of from room temperature (20° C.) and up to lower than 120° C. can be used to produce cross-linkage. In general, the time for effecting the cross-linkage is inversely proportional to the temperature. With a lower temperature, a longer time is required than with a higher temperature.

The invention can be employed for the production of fibers and filaments by spinning the selected solution in an evaporative medium at an elevated temperature, and thereafter effecting the cross-vulcanization, as hereinbefore described. Additionally, the solutions can be extruded in the desired shape into an appropriate precipitating bath and, after removal of the shaped article from the bath and drying, subjected to the cross-linking operation.

In both the formation of pellicular materials and of fibers and filaments, the evaporation of the solvent and the heat treatment to effect cross-linkage can be obtained in a continuous operation.

Instead of forming a shaped article from the composition, the latter can be coated on any appropriate base material and the coated material subjected to heat whereby the clear, insoluble film will be formed as a coating.

The invention provides a method of treating a cellulose derivative to make it less crystalline and rigid and therefore softer and more pliable. The films or fibers produced by this invention can be used for any purpose where insolubility and flexibility are required. Fibers formed of 85 parts of crotyl cellulose and 15 parts of polymeric diene containing hydroxyl groups, such as the copolymer of butadiene with dimethyl 2-vinylethynyl carbinol, are very soft and warm. They can be used for underwear, baby clothes, sweaters, novelty dress goods, etc. The films of this invention can be used for shower curtains, raincoats, etc.

Since it is obvious that many changes and modifications can be made in the above-described details without departing from the nature and spirit of the invention, it is to be understood that the invention is not to be limited thereto except as set forth in the appended claims.

I claim:

1. A vulcanizate from a compatible mixture comprising a copolymer selected from the group consisting of butadiene/dimethyl 2-vinylethynyl carbinol and butadiene/dimethyl isopropenylethynyl carbinol copolymer and a crotyl cellulose containing between two and three substituents per glucose unit and at least 0.85 crotyl group per glucose unit, the ratio of the butadiene to said carbinol in said copolymers being within the limits of 50:50 to 80:20.

2. A vulcanizate from a compatible mixture comprising a copolymer of butadiene and dimethyl 2-vinylethynyl carbinol and a crotyl cellulose containing between two and three substituents per glucose unit and at least 0.85 crotyl group per glucose unit, the ratio of butadiene to said carbinol in said copolymer being within the limits of 50:50 to 80:20.

3. A vulcanizate in accordance with claim 2 wherein said copolymer is comprised of 70 parts butadiene and 30 parts dimethyl 2-vinylethynyl carbinol.

4. A vulcanizate from a compatible mixture comprising a copolymer of butadiene and dimethyl isopropenylethynyl carbinol and a crotyl cellulose containing between two and three substituents per glucose unit and at least 0.85 crotyl group per glucose unit, the ratio of butadiene to said carbinol in said copolymer being within the limits of 50:50 to 80:20.

5. A vulcanizate in accordance with claim 4 wherein said copolymer is comprised of 60 parts butadiene and 40 parts dimethyl isopropenylethynyl carbinol.

6. A method which comprises forming a compatible mixture of a copolymer selected from the group consisting of butadiene/dimethyl 2-vinylethynyl carbinol and butadiene/dimethyl isopropenylethynyl carbinol copolymer and a crotyl cellulose containing between two and three substituents per glucose unit and at least 0.85 crotyl group per glucose unit; shaping said mixture into a desired form; and subsequently vulcanizing said mixture, the ratio of the butadiene to said carbinol in said copolymers being within the limits of 50:50 to 80:20.

7. A method in accordance with claim 6 wherein said copolymer is a butadiene/dimethyl 2-vinylethynyl carbinol copolymer, the ratio of the said butadiene to the said carbinol being within the limits of 50:50 to 80:20.

8. A method in accordance with claim 6 wherein said coplymer is a butadiene/dimethyl isopropenylethynyl carbinol copolymer, the ratio of the said butadiene to the said carbinol being within the limits of 50:50 to 80:20.

WILLIAM HALE CHARCH.

REFERENCES CITED

The following references are of record in the file of this patent:

UNITED STATES PATENTS

| Number | Name | Date |
|---|---|---|
| 2,336,985 | Freund | Dec. 14, 1943 |
| 2,414,144 | Ernsberger | Jan. 14, 1947 |

FOREIGN PATENTS

| Number | Country | Date |
|---|---|---|
| 497,841 | Great Britain | Dec. 28, 1938 |